United States Patent Office 2,878,635
Patented Mar. 24, 1959

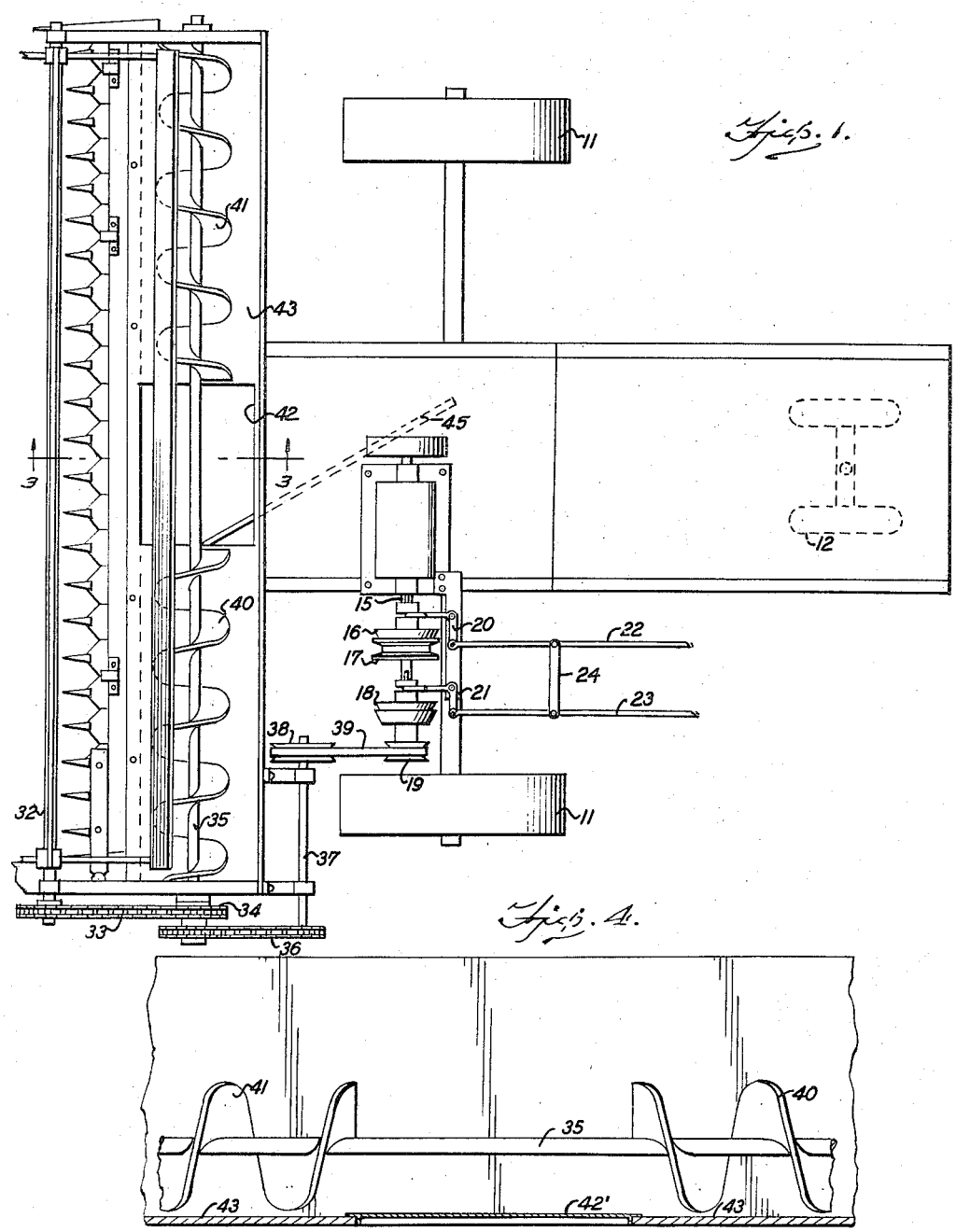

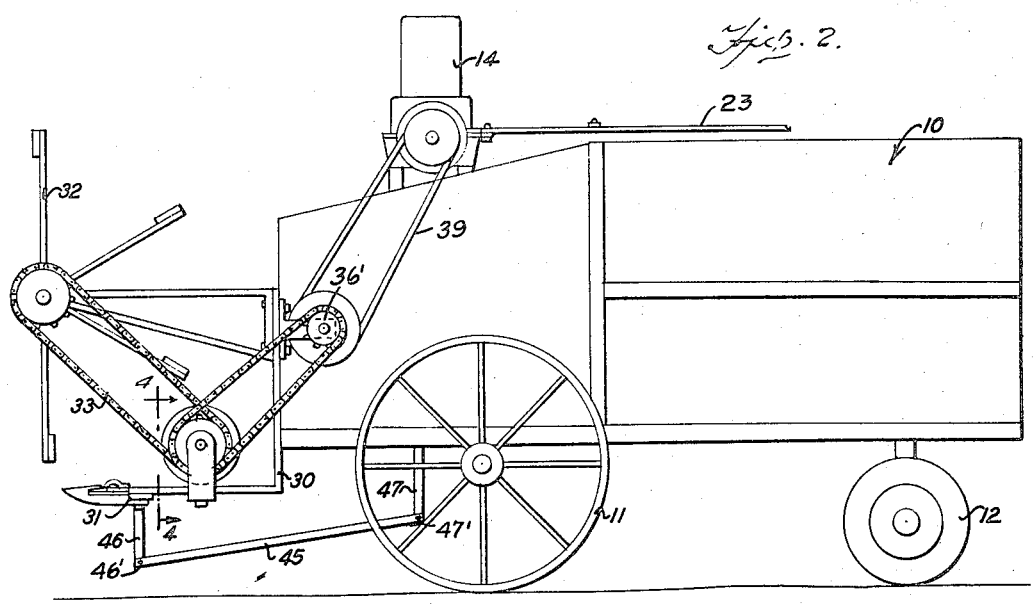
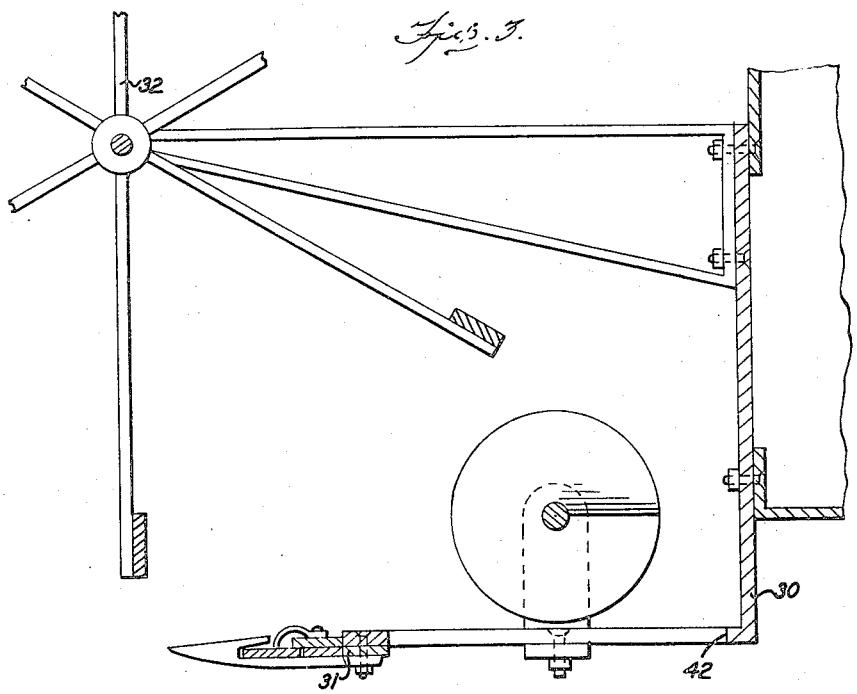

2,878,635

WINDROW HARVESTER

Fred W. Damkroger, De Witt, Nebr.

Application June 22, 1955, Serial No. 517,126

1 Claim. (Cl. 56—192)

This invention relates to harvesters and is particularly concerned with combination harvester-threshers, by which, during normal operation, grain is cut, elevated and threshed in a single travel of the combine thereover.

While combines have long been in successful operation, there are certain circumstances where a cutting operation only, is advisable, as where the grain is wet and a drying period is required before threshing. Under such circumstances, the usual combine with its constantly operating thresher unit, together with its elevator for raising the cut grain to the thresher cannot be used. Therefore, when the grain is damp and an intermediate drying period is required between cutting and threshing, a separate mower unit has, in the past, been required. This requirement has been imposed, by reason of the fact, that in the normal combine, power is simultaneously supplied to both the mower, including its reel, sickle and conveyor and to the thresher unit, including its vertical conveyor through a single clutch. Hence, drive of the mower unit alone is impossible. Furthermore, the usual combine provides no means for the discharge of the cut material, other than through the thresher unit and no means for depositing the crop in windrows, as is necessary where an intermediate drying is desired.

Therefore, it is among the primary objects of the present invention to provide a new and improved harvester which is adaptable for selected use, either for combined mowing and threshing or for mowing and windrowing of the crop.

A further object of the invention is to provide in a combine for the discharge and windrowing of crops without delivery thereof through the threshing unit of the machine.

Another object of the present invention is to provide in an otherwise generally conventional combine, for the power drive of the mowing unit thereof without drive to the thresher unit.

A further object of the invention is to provide in a combine for individual clutch control for the mower and threshing units thereof and to provide for the simultaneous actuation of such clutches.

Numerous other objects, features and advantages of the invention will be apparent from a consideration of the following specification taken in conjunction with the accompanying drawings in which:

Fig. 1 is a top plan view of one preferred form of the present invention;

Fig. 2 is a side elevation of that form of the invention shown in Fig. 1;

Fig. 3 is an enlarged sectional view, taken on the line 3—3 of Fig. 1; and

Fig. 4 is a fragmentary enlarged sectional view taken on the line 4—4 of Fig. 2.

That form of the invention herein presented, by way of example, may be generally characterized as providing, in an otherwise generally conventional combine structure, independently operable clutch means for operating the thresher unit and the mower unit, so that the latter may be operated independently of the former. The invention also visualizes means for operating such clutches together as a unit when the usual combine operation is desired. The invention further provides, not only for the discharge of severed crops directly to the ground and without elevation to the thresher unit, but further, for the windrowing of such crops in a row free from the paths of travel of the machine wheels. Broadly speaking, then, the invention provides for the use of a conventional combine in the mowing and windrowing of crops without threshing thereof.

Referring now to the drawings, the combine generally is indicated by the numeral 10 and includes the usual widely spaced front wheels 11 forwardly of which is mounted the mower unit while following are centrally mounted wheels 12 supporting thereover the thresher unit. Since the present invention is not concerned with the structure or operation of the thresher, as such, and since those skilled in the art are fully familiar therewith, the present application is not encumbered with any detailed showing or discussion thereof. It will be understood, in the practice of the invention, that the same is applicable to a wide variety of conventional combines and that hence, the present disclosure is schematic.

Such conventional combines include a power plant, as indicated at 14, which, in most instances, include a single clutch by which power is transmitted simultaneously to both the thresher unit and the mower. However, in the present invention, the power plant drive shaft 15 is equipped with a first clutch 16, by which power is transmitted to a thresher driving pulley 17 and a second independently operable clutch 18 by which power is transmitted to a mower drive pulley 19. The clutches 16 and 18 are independently manually operable by control means including individual bellcranks 20 and 21, which in turn are manipulated by clutch shift levers 22 and 23. When it is desired to operate the device as a conventional combine with both the thresher unit and the mower unit functioning, the clutch levers 22 and 23 may be joined by a securing link 24 which may be grasped by the hand of the operator to provide for a single simultaneous manual operation of both clutches.

While the thresher unit is not shown structurally, since any conventional thresher may be employed, the mower or stalk cutting unit is depicted in more detail, since certain modifications thereof are incorporated to provide for the ground discharge of the crop when the thresher is not in operation. The mower unit, as here presented, includes a generally rectangular open fronted housing 30 upon the forward edge of the lower wall of which is mounted the usual sickle bar and guard finger assembly 31. Mounted forwardly and above the sickle bar assembly 31 there is provided the usual reel 32 driven by chain 33 from the sprocket 34 of the screw conveyor shaft 35. The shaft 35 is in turn driven by chain 36 from the sprocket 36′ on shaft 37 which carries pulley 38. Pulley 38 is to be driven by belt 39 operating from pulley 19 under the control of clutch 18.

The stalks forced rearwardly within the housing 30 by the reel 32 and severed by the sickle assembly 31 are conveyed toward the center of the housing 30 by the oppositely directed spiral conveyor flights 40 and 41 mounted on the conveyor shaft 35. When the thresher is in operation through engagement of the clutch 16, the stalks are conveyed thereto by an upwardly inclined conveyor forming a part of the thresher unit and not here illustrated. However, when the thresher is not in operation and the device is to be used as a mower and windrower, the stalks are permitted to pass downward and outwardly through a central opening 42 formed in the lower horizontal floor 43 of the housing 30. It will, of course, be understood, that with the thresher in operation, the opening 42 will be closed by a suitable door or plate 42' as shown in Fig. 4.

For windrowing, the severed stalks as they are conveyed to and discharged from the opening 42, there is provided a transversely inclined baffle or guide board 45 supported at its forward end to one side of the opening 42 by the post 46 depending from the sickle assembly and at its rear end by the post 47 adjacent the opposite side and rearwardly of the opening 42. The posts 46 and 47 may be secured to the guide board 45 by suitable fastening means 46' and 47', respectively. In the arrangement of the guide board, it will be noted, that its lateral extension is beyond the path of the wheels 12 and hence, the windrow formed thereby will be free from the path of such wheels. It will be obvious that stalks delivered through the opening 42 will be engaged by the guide board 45 and moved transversely of the combine thereby depositing the stalks in windrows.

From the foregoing, it will be readily seen that the present invention provides for either the combined severing and threshing of crops or for the severing and windrowing thereof as may be desired. It will be noted, that the clutches 16 and 18 may be simultaneously actuated through the means of link 24 when so desired, as when the device is used as a combine or the clutch 18 may be operated independently when the device is to be used for mowing and windrowing the crop. The invention, therefore, provides a single machine by which either of the two harvesting operations may be performed. While one preferred structural embodiment of the invention is here presented, it is to be understood, that numerous changes, modifications and the full use of equivalents may be resorted to in carrying out the inventive concept without departure from the spirit and scope thereof, as outlined in the oppended claim.

What is claimed is:

A harvester comprising a mobile frame, a power operated cutter across a forward portion thereof, at least one transverse conveyor to the rear of said cutter, a floor extending rearwardly from said cutter and below said transverse conveyor, said floor being provided with an opening adjacent a discharge end portion of the transverse conveyor and a guide board below said floor and extending rearwardly and at an acute angle from a side portion of said opening whereby crops cut by said cutter and discharged through said opening by said transverse conveyor will be windrowed by said guide board.

References Cited in the file of this patent
UNITED STATES PATENTS

| | | |
|---|---|---|
| 1,195,578 | Goossen | Aug. 22, 1916 |
| 1,374,424 | Brook | Apr. 12, 1921 |
| 1,405,774 | Fric | Feb. 7, 1922 |
| 1,598,234 | Baldwin | Aug. 31, 1926 |
| 1,799,306 | Mainland | Apr. 7, 1931 |
| 2,278,394 | Walters | Mar. 31, 1942 |
| 2,641,097 | Mast | June 9, 1953 |